United States Patent [19]

Dolan

[11] 4,292,348

[45] Sep. 29, 1981

[54] LOW DENSITY CERAMIC INSULATING

[75] Inventor: Calvin M. Dolan, King of Prussia, Pa.

[73] Assignee: Johnson Matthey, Inc., Malvern, Pa.

[21] Appl. No.: 112,106

[22] Filed: Jan. 14, 1980

[51] Int. Cl.[3] .................... B05D 3/00; B05D 1/28; B05D 3/12; B01J 35/00

[52] U.S. Cl. .................... 427/299; 252/477 R; 427/356; 427/401; 427/403; 427/428; 427/379

[58] Field of Search .............. 252/477 R; 427/356, 427/428, 204, 403, 299, 401, 379

[56] References Cited

U.S. PATENT DOCUMENTS

| | | | |
|---|---|---|---|
| 3,799,796 | 3/1974 | Hunter | 252/477 X |
| 3,929,671 | 12/1975 | Nakamura et al. | 252/477 X |
| 3,972,721 | 8/1976 | Hammel et al. | 106/40 V |
| 3,986,528 | 10/1976 | Green | 138/177 |
| 4,038,214 | 7/1977 | Gotoh et al. | 252/458 |
| 4,039,480 | 8/1977 | Watson et al. | 252/455 R |
| 4,077,908 | 3/1978 | Stenzel et al. | 252/455 R |
| 4,092,194 | 5/1978 | Green | 156/89 |
| 4,093,771 | 6/1978 | Fletcher | 428/312 |
| 4,130,452 | 12/1978 | Indri | 156/89 |

OTHER PUBLICATIONS

Technical Bulletin 14-2-2 by Emerson & Cuming, Inc; Apr. 1978.
*Create New Products, Improved Present Products with Eccospheres Glass & Ceramic Microballons*, Emerson & Cuming, Inc.

*Primary Examiner*—Michael R. Lusignan
*Attorney, Agent, or Firm*—Cushman, Darby & Cushman

[57] ABSTRACT

An insulating system and the method for the preparation thereof, for preparing a catalyst substrate or catalyst to provide a final product wherein a packing and catalyst are insulated from each other. A thin coat of low viscosity ceramic inorganic fiber formulaton is applied to a clean dry substrate or catalyst to wet the surface thereof to facilitate adhesion. Then at least one coat of high viscosity inorganic fiber formulation including a quantity of hollow silica microspheres is applied to the thin coat to provide an insulating coating of desired thickness (e.g. 45 mils ± 15 mils). Then the insulating coating is dried. The high viscosity ceramic inorganic fiber formulation is preferably produced from the low viscosity ceramic inorganic fiber formulation by the addition of the hollow silica microspheres thereto, providing very precise viscosity control. The final substrate or catalyst coating system produced has a thermal conductivity of about 2.7 BTU in $h^{-1}$ $ft.^{-2} F^{-1}$, or less, at about 1500° F.

9 Claims, 4 Drawing Figures

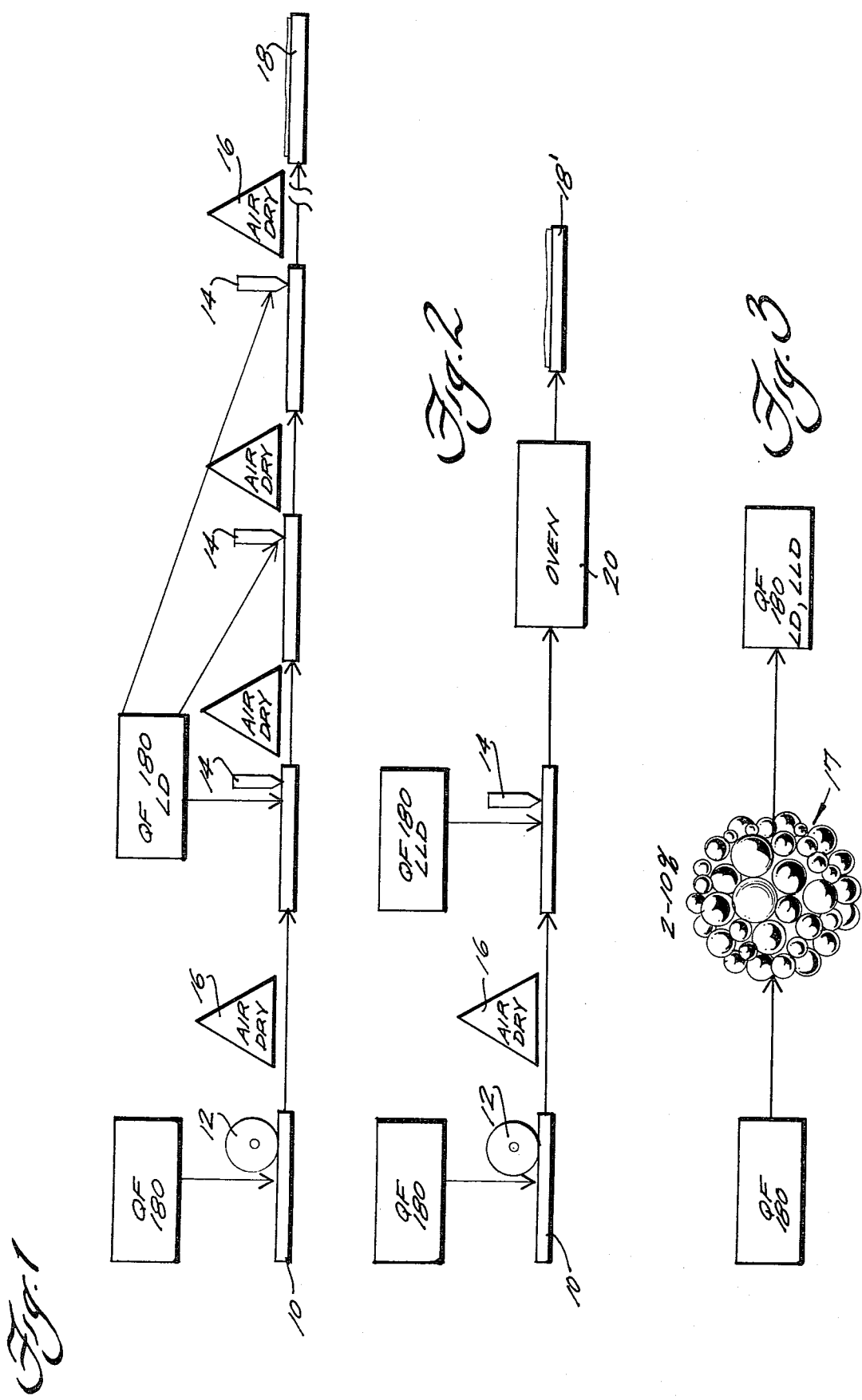

LOW DENSITY CERAMIC INSULATING

The method according to the present invention can be operated at commercial production speeds, results in the application of a coating having excellent insulating properties so that annealing of the packing will not occur, allows the thickness of the coating to be precisely controlled, and effects adhesive bonding of the coating to the substrate or catalyst so that it maintains sufficient strength at use temperatures. The method can be practiced utilizing conventional production equipment, and is advantageous in that only one type of coating material need be purchased, which coating material may be acted upon as desired within the teachings of the inventive method to produce the desired results. The thermal conductivity of the insulating coating is about 2.7 BTU in $h^{-1} ft.^{-2} F^{-1}$, or less, at about 1500° F.

According to one aspect of the present invention, a method of preparing a substrate or catalyst so that the catalyst and packing are insulated from each other in a final product produced, comprises the following steps: Applying a thin coat of low viscosity ceramic inorganic fiber formulation to a clean dry substrate or catalyst to wet the surface thereof to facilitate adhesion; applying at least one coat of high viscosity ceramic inorganic fiber formulation, including a quantity of hollow silica microspheres to the same material comprising the thin coat to provide an insulating coating of desired thickness; and drying the insulating coating.

The thin coat may be applied by roll coating and the subsequent coat or coats may be applied by blade coating, the roll coating being accomplished at room temperature. The insulating coating has a thickness of about 45 mils±15 mils. The low viscosity formulation has a viscosity of about 483–1197 centipoise at 21.1° C., whereas the high viscosity formuation has a viscosity of about 96,000–336,000 centipoise or about 60,000–100,000 centipoise, depending upon whether it will be applied in one coat or several coats. The high viscosity formulation is produced by mixing about 2 to 10% by weight hollow silica microspheres with the low viscosity formulation. About 5% rigidizer may be added to the low density formulation before roll coating thereof.

The term "ceramic inorganic fiber formulation" according to the present invention means "FIBERFRAX", a proprietary ceramic product that may be purchased from the Carborundum Company, or a similar formulation having the same basic insulating, stability, and high temperature usage characteristics as FIBERFRAX. The term "rigidizer" as used in the present specification and claims refers to colloidal silica or like formulations, such as are commercially available from the Carborundum Company, which are sold for use with ceramic inorganic fiber formulations such as FIBERFRAX.

According to another aspect of the present invention, a catalyst substrate or a catalyst having an insulating coating on a surface thereof that is incapable of being lifted off by the insertion and levering of a metal blade at the bond line, even over extended usage, is provided. The insulating coating may have a thickness of about 45 mils±15 mils or less, and a thermal conductivity of about 2.7 BTU in $h^{-1} ft.^{-2} F^{-1}$, or less, at about 1500° F. The coated catalyst or substrate, when formed into the final product for use as a catalytic converter or the like, functions so that no annealing of the substrate will occur even if the catalytic converter can is placed close to the engine manifold.

It is the primary object of the present invention to provide an insulating system for a catalyst substrate or catalyst with the catalyst produced as the final product having a relatively thin coating of insulating material that is capable of preventing passage of sufficient heat from the catalyst hence preventing the destruction of the packing. This and other objects of the invention will become clear from an inspection of the detailed description of the invention, and from the appended claims.

BRIEF DESCRIPTION OF THE DRAWINGS

FIG. 1 is a schematic view illustrating one exemplary method according to the present invention;

FIG. 2 is a schematic view illustrating a second exemplary method according to the present invention;

FIG. 3 is a schematic view illustrating an exemplary manner of formulating insulating coating material according to the present invention.

DETAILED DESCRIPTION OF THE INVENTION

Figure 4:
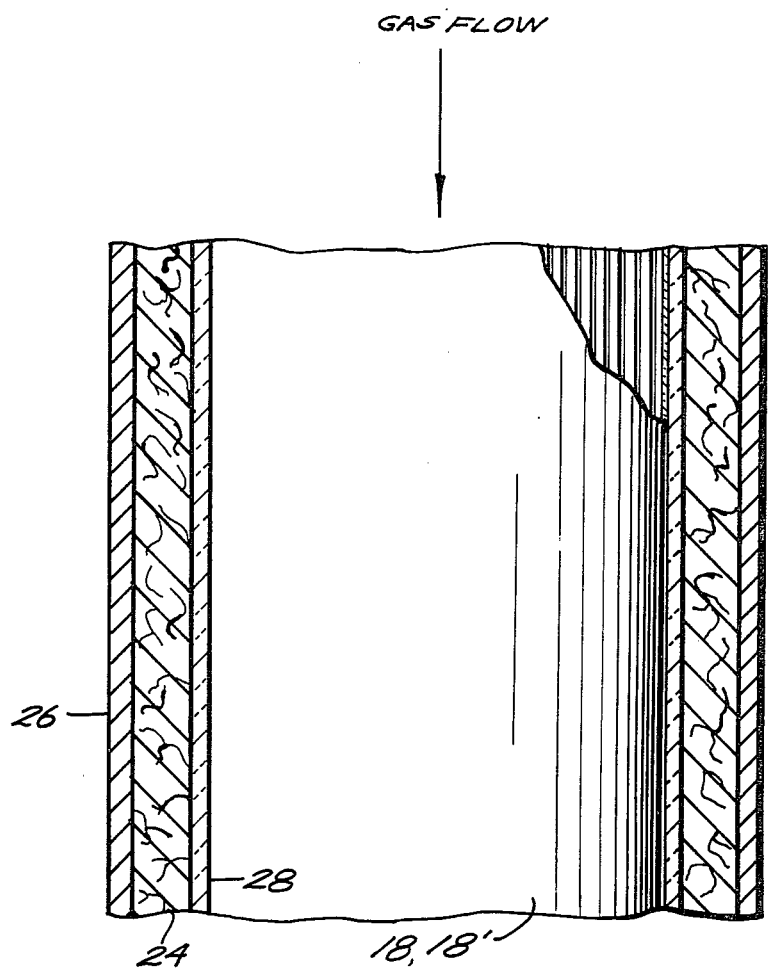
FIG. 4 is a schematic view partly in cross-section and partly in elevation of an exemplary LOC assembly to the invention.

According to the method of the present invention an adhesive bond of insulating material is coated to a substrate or catalyst surface at a controlled thickness, and at commercial production speed utilizing conventional production equipment. A typical catalyst such as used in conventional catalytic converters for motor vehicles, is first cleaned, such as by glass bead blasting or with Zirconia, to improve adhesion before any insulating coating is applied. Preferably the catalyst or substrate 10 is dry before application also to facilitate adhesion of the coating, and is maintained at about room temperature, preheating of the surface of the substrate or catalyst 10 not normally providing any improved adhesion.

The particular coating utilized in practicing the invention comprises a ceramic inorganic fiber formulation with hollow silica microspheres added. The term "ceramic inorganic fiber formulation" as used in the present specification and claims means FIBERFRAX, a proprietary ceramic product sold by the Carborundum Company, or a like formulation having the stability, general insulating qualities, and high temperature utilization characteristics of FIBERFRAX. The type of FIBERFRAX most suited for practicing the invention is QF-180. This material has a solids content of about 66 to 70%, of which 54 to 60% is $SiO_2$; 39 to 43% is $Al_2O_3$; 0.75 to 0.85% is $Na_2O$; 0.75 to 0.63% is $B_2O_3$; and 0.38 to 0.42% is MgO. The viscosity of this material is about 483–1197 centipoise at 21.1° C. The formulation QF-180 that is utilized in practicing the invention preferably is acted upon to provide the final coatings of insulating formulation so that it has the viscosity properties of QF-150 or QF-165 FIBERFRAX. QF-150 FIBERFRAX is 70 to 79% solids with about 55 to 61% of that $SiO_2$ and about 40 to 44% $Al_2O_3$ (with other materials having the same content range as for QF-180), while for QF-165 the solids content is about 69 to 76%. The viscosity of QF-150 at 21.1° C. is about 96,000–336,000 centipoise, while the viscosity of QF-165 is about 60,000–100,000.

As an important first step in achieving adhesion of the coating to the substrate or catalyst 10 according to the method of the present invention a low viscosity ceramic inorganic fiber formulation, such as QF-180, is applied to a clean dry substrate or catalyst 10 at room temperature, as illustrated schematically in FIGS. 1 and 2. The thin coat of the low viscosity formulation is applied by a conventional roller 12 or the like, and is sufficient to wet the surface of the substrate or catalyst to facilitate the adhesion. The low viscosity formulation has about 5% rigidizer added thereto. The term "rigidizer" as used in the present specification and claims means a colloidal silica or like rigidizer compatible with the particular inorganic fiber formulation, such as that sold by the Carborundum Company.

After the application of the thin coat, the substrate or catalyst 10 may be dried with air at elevated temperature (about 135° to 150° C.), as by passing it under a conventional industrial blower 16, and then is passed to a or several subsequent coating stations. Subsequent applications of coating are preferably accomplished utilizing a doctor blade 14 or the like.

In the method illustrated schematically in FIG. 1, the substrate or catalyst 10 with the thin coating of insulating material is passed to a plurality of coating stations having doctor blades 14. At these stations a coat of high viscosity ceramic inorganic fiber formulation, including a quantity of hollow silica microspheres, is added to the thin coat to ultimately provide an insulating coating of desired thickness (e.g. 45 mils±15 mils). In the method illustrated in FIG. 1, the high viscosity ceramic inorganic fiber formulation is designated as QF-180 LD, which has a viscosity of about 60,000–100,000 centipoise at 21.1° C. Each applied coat is about 10 mils thick, four to five coats being necessary to produce an insulating coating of the preferred thickness of about 45 mils. Air drying utilizing an industrial blower 16 or the like is practiced after each coating operation, the drying temperature being about 135° to 150° C.

The high viscosity ceramic inorganic fiber formulation utilized in practicing the present invention preferably is formed from the low viscosity formulation QF-180 or the like. The steps resulting in the formation are schematically illustrated in FIG. 3. The low viscosity formulation QF-180 has a quantity of hollow silica microspheres 17 added thereto. Such microspheres are commercially available from Emerson and Cuming, Inc., sold under the name ECCOSPHERES-Si. When added to the low viscosity formulation, the microspheres 17 both increase the viscosity of the formulation and increase the insulating properties thereof, both of which are very desirable effects when practicing the present invention. When formulating QF-180 LD, about 2% by weight microspheres 17 are added. By so formulating the coating material, its viscosity can be precisely controlled no matter what the original viscosity of the low viscosity formulation (i.e. QF-180). The viscosity of the coating material produced in this manner is substantially the same as that of QF-165, yet the coating material has greatly enhanced insulating properties. A comparison of the insulating properties of QF-180 LD and QF-165 are provided by the following table:

| Temperature °F. | Thermal Conductivity BTU in $h^{-1}ft.^{-2}F^{-1}$ | |
| --- | --- | --- |
|  | QF-180-LD | QF-165 |
| 500 | 2.0 | 3.45 |
| 1000 | 2.35 | 3.75 |

-continued

| Temperature °F. | Thermal Conductivity BTU in $h^{-1}ft.^{-2}F^{-1}$ | |
| --- | --- | --- |
|  | QF-180-LD | QF-165 |
| 1500 | 2.65 | 4.0 |

By practicing the method of FIG. 1, a final product 18 is produced which comprises a catalyst substrate or a catalyst having an insulating coating on a surface thereof, the coating having a thermal conductivity of about 2.7 BTU in $h^{-1}ft.^{-2}F^{-1}$, or less, at about 1500° F., with a thickness of about 45 mils±15 mils. Of course the exact thickness will vary depending upon the particular requirements.

The method illustrated in FIG. 2 is similar to that illustrated in FIG. 1 except that thin coating is accomplished in one step. The coating material applied to the substrate or catalyst 10 by the doctor blade station 14 in FIG. 2 is designated QF-180 LLD, and comprises a high viscosity ceramic inorganic fiber formulation, with the viscosity about 96,000–336,000 centipoise at 21.1° C. (sufficient to effect a 45 mil coating or the like in one operation). The formulation QF-180 LLD is preferably produced from QF-180, with the addition of 3 to 10% microspheres 17 (as illustrated in FIG. 3), the viscosity again being precisely controllable and the insulating properties of the final formulation being greatly enhanced even compared to QF-180 LD. The coated substrate or catalyst 10 is then passed through an oven 20 or the like, to produce the final coated substrate or catalyst 18'.

To make a final product for use in a conventional motor vehicle catalytic converter or the like, the coated substrate or catalyst 18, 18' (see FIG. 4) is then combined with a packing 24 and cam 26 respectively, to produce a product having an insulating coating 28 between the packing 24 and catalyst 18, 18', which insulating coating prevents annealing of the packing 24, or like destructive action. Thus, where the packing 24 is stainless steel mesh in a LOC or TWC catalyst system for a motor vehicle catalytic converter, the mesh will hold the catalyst in the can without degradation of its functional properties even when placed close to the engine manifold.

EXAMPLE

A typical catalyst 10 for use in a catalytic converter for a motor vehicle was cleaned by glass bead blasting, the surface thereof was maintained dry and at room temperature, and a coat of FIBERFRAX QF-180 with 5% rigidizer was applied to the surface with a roller 12 to wet the surface. The catalyst 10 was then passed to five successive stations wherein FIBERFRAX QF-180 with 2% by weight hollow silica microspheres was applied. A coating thickness of approximately 10 mils was applied at each station with a conventional doctor blade 14. After each coating step the coating was dried with a conventional industrial blower 16 at about 135° to 150° F. The final coated catalyst 18 produced had a coating thickness of about 45 mils. The adhesive strength of the coating was good even when exposed to a temperature of 1500° F. for one hour [the coating passing an oven-tape test]. The thermal conductivity of the insulating coating was measured and found to be 2.65 BTU in $h^{-1}ft^{-2}F^{-1}$ at 1500° F. The coated catalyst 18 was produced in less than 8 minutes utilizing conventional production equipment.

It will thus be seen that according to the present invention a practical method for preparing a catalyst substrate or catalyst so that the catalyst and packing are insulated from each other in the final product produced, and the catalyst or packing so produced according to the method, are provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of preparing an insulating system for a catalyst to be packed in a can, said method consisting essentially of the steps of
   (a) applying a thin coat of low viscosity ceramic inorganic fiber formulation with about 5% rigidizer to a clean, dry substrate or catalyst to wet the surface thereof to facilitate adhesion, the ceramic inorganic fiber formulation having a viscosity of about 483–1197 centipoise at 21.1° C.;
   (b) producing a high viscosity ceramic inorganic fiber formulation by mixing about 3–10% hollow silica microspheres with the low viscosity ceramic inorganic fiber formulation, the high viscosity formulation having a viscosity of about 96,000–336,000 centipoise at 21.1° C.;
   (c) applying a single coat of the high viscosity ceramic inorganic fiber formulation to the thin coated substrate or catalyst to provide a ceramic inorganic fiber formulation having sufficient thickness to provide the necessary insulation; and
   (d) drying the coated substrate or catalyst.

2. A method of preparing a catalyst to be packed in a can, said method consisting essentially of the steps of
   (a) applying a thin coat of low viscosity ceramic inorganic fiber formulation with about 5% rigidizer to a clean, dry substrate or catalyst at about room temperature to wet the surface thereof to facilitate adhesion, the ceramic inorganic fiber formulation having a viscosity of about 483–1197 centipoise at 21.1° C.;
   (b) producing a high viscosity ceramic inorganic fiber formulation by mixing about 2% hollow silica microspheres with the low viscosity ceramic inorganic fiber formulation, the high viscosity formulation having a viscosity of about 60,000 to 100,000 centipoise at 21.1° C.;
   (c) applying a plurality of coats of high viscosity ceramic inorganic fiber formulation to the thin coated substrate or catalyst until a coating thickness sufficient to provide the necessary insulating is produced; and
   (d) drying each coat after application thereof.

3. A method as recited in claim 1 or 2 wherein step (a) is accomplished at about room temperature.

4. A method as recited in claim 1 or 2 wherein step (c) is practiced so that the coating thickness is about 45 mils ± 15 mils.

5. A method as recited in claim 1 or 2 wherein step (a) is accomplished by roll coating, and wherein step (c) is accomplished by blade coating.

6. A method as recited in claim 1 or 2 comprising the further step of providing the catalyst interiorly of a can with a packing disposed between the catalyst and the can, and with said coating disposed between the packing and the catalyst.

7. A method as recited in claim 1 or 2 wherein the substrate or catalyst has been cleaned by glass bead blasting or with Zirconia before step (a) is practiced.

8. A method as recited in claim 1 or 2 wherein step (d) is accomplished by passing the coated substrate or catalyst through an oven dryer.

9. A method as recited in claim 1 or 2 wherein step (d) is accomplished at a temperature of about 135°–150°.

* * * * *